US012438367B2

(12) United States Patent
Kuroda et al.

(10) Patent No.: US 12,438,367 B2
(45) Date of Patent: Oct. 7, 2025

(54) POWER SYSTEM OPERATION PLAN CREATION ASSISTANCE DEVICE AND METHOD

(71) Applicant: Hitachi, Ltd., Tokyo (JP)

(72) Inventors: Eisuke Kuroda, Tokyo (JP); Kunihiko Tsunedomi, Tokyo (JP); Daiki Nishimura, Tokyo (JP); Shinya Ohara, Tokyo (JP); Yasuyuki Tada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 357 days.

(21) Appl. No.: 18/038,123

(22) PCT Filed: Jul. 19, 2021

(86) PCT No.: PCT/JP2021/026957

§ 371 (c)(1),
(2) Date: May 22, 2023

(87) PCT Pub. No.: WO2022/118495

PCT Pub. Date: Jun. 9, 2022

(65) Prior Publication Data

US 2023/0420937 A1 Dec. 28, 2023

(30) Foreign Application Priority Data

Dec. 4, 2020 (JP) ................................ 2020-201658

(51) Int. Cl.
*H02J 3/00* (2006.01)
*H02J 3/38* (2006.01)

(52) U.S. Cl.
CPC ............ *H02J 3/003* (2020.01); *H02J 3/0012* (2020.01); *H02J 3/004* (2020.01); *H02J 3/381* (2013.01);

(Continued)

(58) Field of Classification Search
CPC .......... H02J 3/003; H02J 3/0012; H02J 3/004; H02J 3/381; H02J 2203/10; H02J 2203/20;

(Continued)

(56) References Cited

U.S. PATENT DOCUMENTS 8,311,863 B1 * 11/2012 Kemp ................ G06Q 10/0639 705/7.29
2004/0158360 A1 * 8/2004 Garland, II ............... H02J 3/38 700/286

(Continued)

FOREIGN PATENT DOCUMENTS

EP 2033060 B1 4/2013
EP 2757648 A2 7/2014

(Continued)

OTHER PUBLICATIONS

A. Takehara et al., "Development of Basic Logics of Optimal Power Flow Calculation for Multiple Cross-sections", a report of the Central Research Institute of Electric Power Industry: T03035, 2004 (English abstract).

(Continued)

*Primary Examiner* — Ziaul Karim
(74) *Attorney, Agent, or Firm* — MATTINGLY & MALUR, PC

(57) ABSTRACT

A power system operation plan creation assistance device and method capable of maintaining or improving system stability or economy includes an optimization target snapshot power flow determination unit that uses one or more pieces of foundational information to determine an optimization target snapshot power flow. The foundational information includes a power generation plan, a total demand prediction, a sales plan, a renewable energy prediction, a work stoppage plan, system data, and a setting value. A system manipulation variable candidate extraction unit uses (Continued)

the one or more pieces of foundational information and the optimization target snapshot power flow to extract a candidate for a variable for a variable manipulating the system. An optimal system configuration calculation unit uses the one or more pieces of foundational information and the system manipulation variable candidate to calculate an optimal system configuration.

9 Claims, 7 Drawing Sheets

(52) U.S. Cl.
CPC ....... *H02J 2203/10* (2020.01); *H02J 2203/20* (2020.01); *H02J 2300/20* (2020.01)

(58) Field of Classification Search
CPC ................. H02J 2300/20; H02J 3/0075; H02J 13/00001; G06Q 10/0631; G06Q 10/06393; G06Q 30/0201; G06Q 10/20; G06Q 10/04; G06Q 50/06
See application file for complete search history.

(56) References Cited

U.S. PATENT DOCUMENTS

2015/0039145 A1* 2/2015 Yang ...................... G05B 13/02 700/291
2015/0262095 A1* 9/2015 Rajasekaran ...... G06Q 10/0637 705/7.28
2015/0263522 A1* 9/2015 Bernal .............. H02J 13/00001 700/295

FOREIGN PATENT DOCUMENTS

JP 11-146560 A 5/1999
JP 2004-242411 A 8/2004
JP 2016-194849 A 11/2016
JP 2018-191482 A 11/2018
JP 2020-178403 A 10/2020
JP 2020-188619 A 11/2020

OTHER PUBLICATIONS

Fisher et al., "Optimal Transmission Switching", IEEE Transactions on Power Systems, vol. 23, No. 3, Aug. 2008, p. 1346-1355.
Zhifang Yang et al., "Optimal Transmission Switching With Short-Circuit Current Limitation Constraints", IEEE Transactions on Power Systems, vol. 31, No. 2, Mar. 2016, p. 1278-1288.
International Search Report of PCT/JP2021/026957 dated Oct. 5, 2021.
Extended European Search Report received in corresponding European Application No. 21900252.4 dated Sep. 30, 2024.

* cited by examiner

POWER SYSTEM OPERATION PLAN CREATION ASSISTANCE DEVICE AND METHOD

TECHNICAL FIELD

The present invention relates to a device and method to assist the creation of operation plans and configuration schemes of a power system.

BACKGROUND ART

In association with assisting the creation of power system operation plans and configuration schemes, documents enumerated below are known. Patent Literature (PTL) 1 is summarized below. To attain reducing investments in power system equipment and effective use of existing equipment, a multi-objective evaluation of supply reliability is demanded. For this purpose, provision is made of a selection means to select from a plurality of system configurations a system configuration candidate that is free from power supply failure in normal operation, while ensuring that power supply is uninterrupted in the event of an assumed fault; and an evaluation value calculation means to calculate the evaluation values of an expected value of blackout time, deviation from an equipment utilization rate, and transmission loss for a system configuration candidate selected by the selection means. Based on three evaluation values obtained by the evaluation value calculation means, an evaluation vector is created and a multifaceted evaluation of supply reliability of a power supply system is performed by this evaluation vector.

Besides, PTL 2 is summarized below. By a multi-objective optimization problem, a derivation is made of turning on/off of switches to determine an optimal system range with control target values, for example, as follows: maintaining a balance between the amount of energy generated and the amount of energy consumed between one and its neighboring one of regional systems with respect to each regional system; minimizing undesirable physical phenomena occurring in a power system, such as frequency variation, voltage drop, and harmonic generation which will occur secondarily for maintaining the balance, and minimizing cost expended for equipment control necessary for maintaining the above balance.

Besides, PTL 3 is intended to provide an optimal power flow calculation device that is able to evaluate multiple snapshot power flows of a power system appropriately. Specifically, in an optimal power flow calculation device 100, a data storage unit 105 stores pieces of information on the power system corresponding to multiple parameters that are given as fixed values in multiple constraint expressions and objective functions with respect to each of the multiple snapshot power flows and an optimal power flow calculation unit 103 executes an optimal power flow calculation based on the multiple parameters per snapshot power flow and thus determines optimal values of multiple variables that are variable values included in the multiple constraint expressions and objective functions. Here, the multiple constraint expressions include multiple first constraint expressions that define a relation on at least a subset of the variables with respect to each snapshot power flow and one or more second constraint expressions that define a relation on at least a subset of the variables, the relation being matching between or among different snapshot power flows.

Besides, Non-patent Literature 1 describes an optimal power flow calculation method for multiple snapshot power flows that optimizes multiple snapshot power flows concurrently.

Besides, Non-patent Literature 2 describes a method for improving supply reliability and economy by optimal transmission switching calculation (OTS: Optimal Transmission Switching) in which not only dispatching generators, also power system topology alteration is added to switching variables. Besides, Non-patent Literature 3 describes a method of OTS in which short-circuit current constraints are added to the OTS of Non-patent Literature 2.

CITATION LIST

Patent Literature

PTL 1: Japanese Patent Application Laid-Open No. 2004-242411

PTL 2: Japanese Patent Application Laid-Open No. Hei11-146560

PTL 3: Japanese Patent Application Laid-Open No. 2018-191482

Non-Patent Literature

Non-patent Literature 1: Takehara Arisa, et al.: "Development of Basic Logics of Optimal Power Flow Calculation for Multiple Snapshot Power Flows", a report of the Central Research Institute of Electric Power Industry: T03035, 2004

Non-patent Literature 2: Fisher et al.: "Optimal Transmission Switching", IEEE Trans. On Power Systems, Vol. 23, No. 3, 2008

Non-patent Literature 3: Yang et al.: "Optimal Transmission Switching With Short-Circuit Current Limitation Constraints", IEEE Trans. On Power Systems, Vol. 31, No. 2, 2016

SUMMARY OF INVENTION

Technical Problem

In a power system, with an increase in total demand, the enhancement of synchronous generators (thermal power generators, hydro generators, nuclear generators, etc.), transmission and transformation equipment, system monitoring/control devices, and protection devices among others has so far been advanced. Thereby, the power system has overcome electrical constraints (thermal capacity, stability of synchronization, voltage stability, frequency stability, and short circuit capacity (short circuit current)) and increased transmission capacity.

Because, in particular, stability of synchronization and voltage stability become unstable for long distance transmission (with increasing impedance), enhancement and parallelization of transmission and transformation equipment make it possible to decrease equivalent impedance and increase transmission power.

On the other hand, a short circuit current (SCC), which means a limit of SCC that can be cut off in case a short circuit fault has occurred in the system, increases, as electrical distance=impedance of a transmission line becomes shorter and, therefore, gets worse contradictorily when an attempt is made to improve the stability of synchronization and the voltage stability by the enhancement of transmission and transformation equipment. Therefore, this has been coped with by developing circuit breakers that are able to cut off a larger SCC and upgrading circuit breakers in the power system to those with larger capacity.

Because an upper limit of circuit breaker capacity is determined to be, e.g., 63 kA, countermeasures mentioned below have been taken: system configuration alteration such as bus splitting (bus separation), divisional operation of transformers, and transmission line loop opening; installation of a current limiting reactor, a high impedance transformer, or a device that limits or cuts off the current with a fuse or the like before a short circuit current SCC reaches a peak; and system splitting by DC equipment.

In conventional operation plans, system configurations such as bus splitting (bus separation) and transmission line loop opening, for example, to obey the short circuit current SCC constraints mentioned above are performed at all times; this results in inflexibility of system configurations and posed a problem in which it is impossible to maintain or improve system state stability and system economy. Besides, conventional operation plans are unable to respond to a change in system stability due to introduction and expansion of renewable energy resources or a change to a new plan or operation strategy, such as wider area system operation and Connect & Manage, and posed a problem in which it is impossible to maintain or improve system state stability and system economy.

As demand growth slows down or turns to decrease, with an increase in power supply of renewable energy resources (such as photovoltaic and wind power generation, hereinafter referred to as renewable energy resources) that is linked in the power system via an inverter (power transformer), there should occur a period when the percentage of synchronous generators linked in the system decreases or synchronous generators are becoming out of usage.

Because the short circuit current SCC of renewable energy resources is smaller in comparison with synchronous generators, with an increase in the percentage of renewable energy resources in linked-in power supply (a decrease in the percentage of synchronous generators), there is a possibility that the short circuit current SCC descends locally in a segment of the system at a certain time.

Consequently, in a segment where system configurations such as bus splitting (bus separation) and transmission line loop opening have so far been carried out at all times to obey the short circuit current SCC constraints, there may occur a period in which system configuration alternation is possible.

On the other hand, frequent switching of circuit breakers increases maintenance cost and, therefore, it is desirable to make switching times as small as possible.

In this regard, PTL 1 describes a method of making a multi-objective evaluation of supply reliability to attain reducing investments in equipment and effective use of existing equipment as a support in system planning of a local supply system. However, this method is unable to respond to a change in short circuit current SCC, system stability, and an operation method due to introduction and expansion of renewable energy resources, as noted previously, and information as to what system configuration should be carried out at what timing is not provided.

According to the descriptions in PTLs 2 and 3 and Non-patent literatures 1, 2, and 3 put together, methods of executing a multi-objective optimization (OPF and OTS for multiple snapshot power flows) are described, regarding turning on/off of switches as switching variables versus multiple snapshot power flows including current and future snapshot power flows and taking account of SCC constraints. However, as with PTL 1, these methods are unable to respond to a change in SCC, system stability, and an operation method due to introduction and expansion of renewable energy resources, as noted previously, and information as to what system configuration should be carried out at what timing is not provided. While relevance to a short circuit current is explained in the above description, this is also true for a fault current such as a ground fault current.

Therefore, the present invention has been developed in view of circumstances noted above and its object resides in providing a power system operation plan creation assistance device and method making it possible to maintain or improve system stability and economy by providing system configurations enabling it to maximize performance of a particular power system for a particular period (including start timing), while minimizing transmission switching times in a system configuration.

Solution to Problem

Therefore, an aspect of the present invention resides in "a power system operation plan creation assistance device characterized by comprising: an optimization target snapshot power flow determining unit which determines snapshot power flows for which to execute optimization using one or more data sets of basic information comprising power generation plans, total demand predictions, sales plans, renewable energy resources predictions, outage plans, system data, and settings; a system switching variable candidate extracting unit which extracts candidates of system switching variables using snapshot power flows for which to execute optimization determined by the optimization target snapshot power flow determining unit and one or more data sets of the basic information; an optimal system configuration calculating unit which calculates optimal system configurations using system switching variable candidates extracted by the system switching variable candidate extracting unit and one or more data sets of the basic information; a stability and economy evaluating unit which evaluates stability and economy using operation plans as optimal system configurations calculated by the optimal system configuration calculating unit and one or more data sets of the basic information; and a display unit which displays on screen, evaluation results obtained by the stability and economy evaluating unit and the operation plans".

Another aspect of the present invention resides in "a power system operation plan creation assistance method that is implemented with a computer, characterized by comprising: an optimization target snapshot power flow determining step which determines snapshot power flows for which to execute optimization using one or more data sets of basic information comprising power generation plans, total demand predictions, sales plans, renewable energy resources predictions, outage plans, system data, and settings; a system switching variable candidate extracting step which extracts candidates of system switching variables using snapshot power flows for which to execute optimization determined by the optimization target snapshot power flow determining step and one or more data sets of the basic information; an optimal system configuration calculating step which calculates optimal system configurations using system switching variable candidates extracted by the system switching variable candidate extracting step and one or more data sets of the basic information; a stability and economy evaluating step which evaluates stability and economy using operation plans as optimal system configurations calculated by the optimal system configuration calculating unit and one or more data sets of the basic information; and a displaying step which displays on screen, evaluation results obtained by the stability and economy evaluating step and the operation plans".

Another aspect of the present invention resides in "a power system operation plan creation assistance method that is implemented with a computer, characterized by: extracting candidates of system switching variables and snapshot power flows at which to observe change in a fault current using demand predictions, renewable energy resources predictions, power generation predictions, outage plans, and system data; seeking a solution by optimal power flow calculation or system switching optimization calculation using the system switching variables and generator output variables at all alternations made by each of the system switching variables; and displaying a degree of reliability, system's Key Performance Indicators, and operation plans.

Advantageous Effects of Invention

According to the present invention, it is enabled to maintain or improve system stability and economy.

BRIEF DESCRIPTION OF DRAWINGS

FIG. 4(*b*) is a diagram representing an example of results of calculations by the optimization target snapshot power flow determining unit in FIG. 2.

DESCRIPTION OF EMBODIMENTS

Embodiments of the present invention are explained with reference to the drawings. Note that embodiments that will be explained hereinafter do not limit the claimed invention and all of elements and their combinations described in an embodiment are not always necessary for a solution of the invention.

In the following, the present invention is explained in detail. Underlying backgrounds, a basic concept of the invention, and what the flowcharts of the invention mean can be stated in summary in the following context.

Embodiment 1

Figure 1:
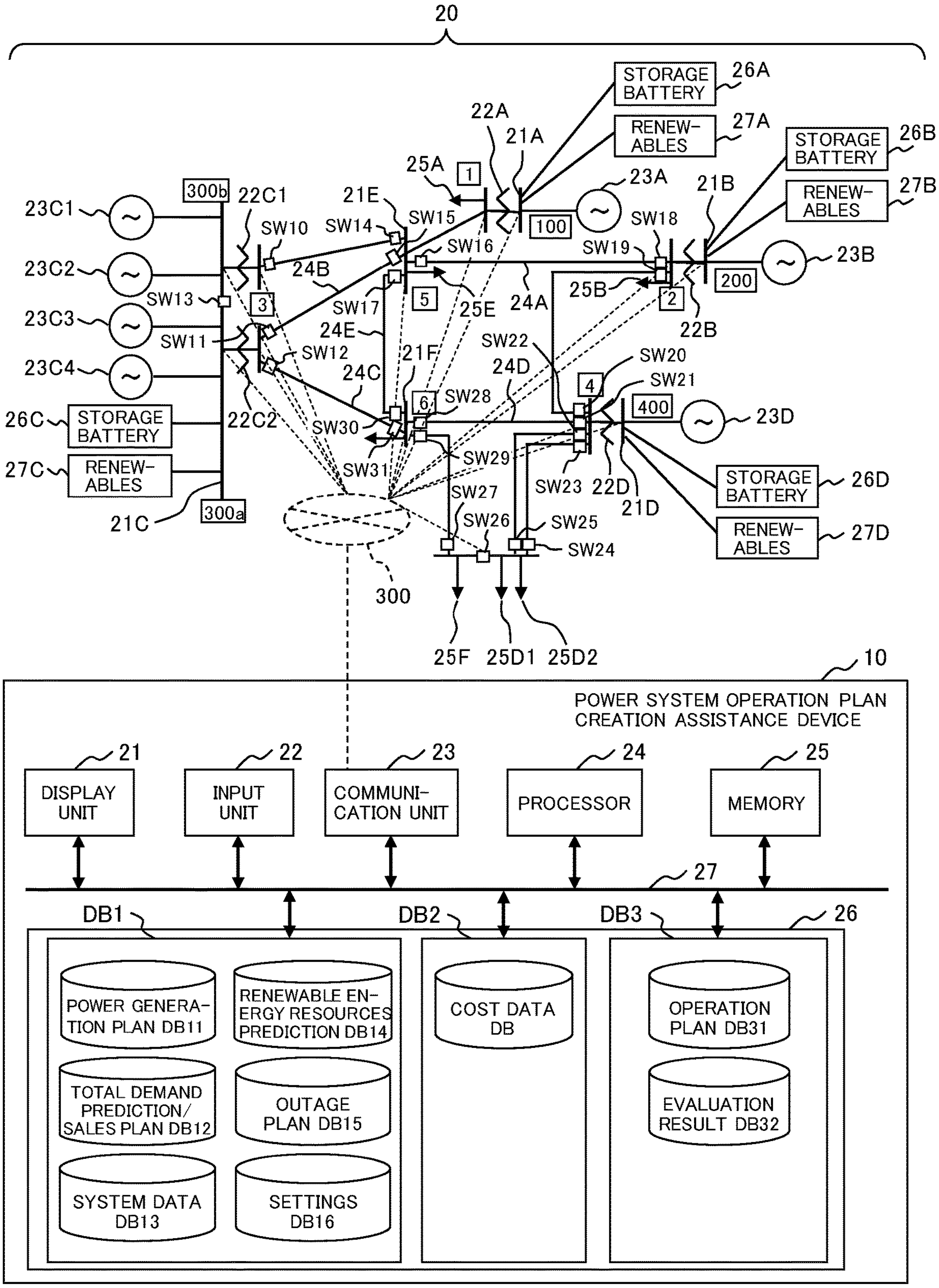
FIG. 1 is a block diagram depicting a hardware configuration of a power system operation plan creation assistance device connected with a power system in relevance to embodiment 1 of the present invention.

FIG. 1 is a block diagram depicting a hardware configuration of a power system operation plan creation assistance device connected with a power system in relevance to embodiment 1. An example of a power system 20 is illustrated in an upper part of FIG. 1 and a power system operation plan creation assistance device in relevance to an embodiment of the present invention is illustrated in a lower part of FIG. 1.

In FIG. 1, the power system operation plan creation assistance device 10 is, for example, configured by a computer system. The power system operation plan creation assistance device 10 executes the creation of an operation plan of switches SW (circuit breakers or disconnectors) in the power system. At the same time, the power system operation plan creation assistance device 10 can provide system configurations enabling it to maximize performance of a particular power system for a particular period (including start timing), while minimizing transmission switching times in a system configuration. From these system configuration schemes, a system operator is to choose a system configuration and put it in operation, thus enabling it to maintain or improve system stability and economy.

The power system operation plan creation assistance device 10 is equipped with a display unit 21, an input unit 22, a communication unit 23, a processor 24, a memory 25, and a storage device 26. The display unit 21, input unit 22, communication unit 23, processor 24, memory 25, and storage device 26 are interconnected via a bus 27.

The display unit 21 displays, inter alia, parameters that are handled by the power system operation plan creation assistance device 10 and results of processing by the power system operation plan creation assistance device 10. The display unit 21 may be a display device or a printer device or an audio output device or the like may be used with the display device.

The input unit 22 is used to input various conditions among others to get the power system operation plan creation assistance device 10 to work. As the input unit 22, inter alia, a keyboard and a mouse can be used; besides, the input unit may include at least any one of the following: a touch panel or an audio instruction device or the like.

The communication unit 23 is provided with circuitry and a communication protocol for connecting to a communication network 300. The communication network 300 may be a WAN (Wide Area Network) such as the Internet, a LAN (Local Area Network) such as WiFi or Ethernet (a registered trademark), or a mixture of WAN and LAN.

The processor 24 executes a computer program and performs the following: searching through data in various databases which are stored in the storage device 26; displaying processing results and giving instructions; and processing involved in the creation of a power system operation plan of the power system 20; among others. The processor 24 may be a CPU (Central Processing Unit) or a GPU (Graphics Processing Unit). The processor 24 may a single core processor or a multicore processor. The processor 24 may be equipped with hardware circuitry (e.g., FPGS (Field-Programmable Gate Array) or ASIC (Application Specific Integrated Circuit)) that performs a part or all of processing. The processor 24 may be equipped with a neural network. The processor 24 may be configured as one or more semiconductor chips or as a computer device like a computing server The memory 25 is, for example, configured as a RAM (Random Access Memory); it stores computer programs and calculation result data and provides a working area necessary for each processing to the processor 24.

The storage device 26 is a storage device having a large storage capacity; e.g., a hard disk device or SSD (Solid State Drive). The storage device 26 is capable of retaining executable files of various programs and data that is used for execution of a program. The storage device 26 is capable of retaining a database DB1 aggregating power generation plans, total demand prediction/sales plans, renewable energy resources predictions, outage plans, system data, and settings data. The storage device 26 is also capable of retaining a cost database DB2 and an operation plan and evaluation result database DB3.

Besides, the storage device 26 is capable of retaining a power system operation plan creating program. The power system operation plan creating program may be software that can be installed in the power system operation plan creation assistance device 10 or may be embedded in the power system operation plan creation assistance device 10 as firmware.

The database DB1 aggregating power generation plans, total demand prediction/sales plans, renewable energy resources predictions, outage plans, system data, and settings data stores one or more of the following databases: a power generation plan database DB11 and a total demand prediction/sales plan database DB12 based on power generation plans and total demand predictions which are predicted by a system planner and power generation plans and sales plans which are submitted from a BG (balancing group) or the like; a renewable energy resources prediction database DB14 pertaining to renewable energy resources predictions that are calculated by another external server or are results of predicting the output of renewable energy resources by the internal processor from predicted values of wind conditions and solar radiation using a renewable energy resource output prediction model; an outage plan database DB15 pertaining to outage plans that are drawn up for, inter alia, maintenance of transmission and transformation equipment, protection devices, etc.; a system data database DB13 pertaining to system data as the specifications of, inter alia, the initial states of transmission and transformation equipment, power supplies, and switches, which are used for calculating stability in various aspects of the power system and for optimization calculation; and a settings database DB16 pertaining to settings data that is used for calculating stability of various aspects, for optimization calculation, and for executing various processing tasks of the power system operation plan creation assistance device. Note that power generation plans, total demand predictions, sales plans, renewable energy resources predictions, outage plans, system data, settings are assumed as basic information.

The cost database DB2 stores one or more of the following costs: cost required to maintain or improve system stability and cost required to improve economy; in particular, power supply, fuel cost for calculating balancing power cost and transmission loss cost; cost pertaining to maintenance required of transformer tapping; cost pertaining to circuit breakers for turning on/off of phase modifying equipment; and cost pertaining to maintenance of circuit breakers and operator operation for transmission switching.

The operation plan and evaluation result database DB3 stores one or more of the following databases: an operation plan database DB31 pertaining to operation plans in optimal system configurations that are calculated by an optimal system configuration calculating unit 13; and an evaluation result database DB32 pertaining to results of evaluation that is calculated by a stability and economy evaluating unit.

The power system operation plan creation assistance device 10 can get access to, inter alia, measurement information of the power system 20 via the communication network 300. The power system is a system in which multiple generators 23A to 23D and loads 25A, 25B, 25D to 25F are interconnected via buses (nodes) 21A to 21F, transformers 22A to 22D, and transmission lines (branches) 24A to 24E among others. The generators 23A to 23D mentioned herein are, for example, thermal power generators, hydro generators, or nuclear generators. In the nodes 21A to 21F, diverse measuring instruments and circuit breakers for protection, control and monitoring of the power system 20 are installed. Also, to the respective nodes 21A to 21F, storage batteries 26A to 26D and renewable energy resource generators 27A to 27D are connected. The renewable energy resource generators 27A to 27D are, for example, a solar generator, a solar thermal generator, a wind turbine, a wind firm, a power flow generator, etc. which are power supplies linked in the system via an inverter; those linked in via HVDC are regarded as renewable energy resource generators.

These power system equipment components are interconnected by switches SW (SW10 to SW31) such as circuit breakers or disconnectors and the configuration of the power system is altered by contact making or breaking of the switches SW.

The power system operation plan creation assistance device 10 gets access to a signal or the like detected by a measuring instrument, as necessary, via the communication network 300 and can acquire one or more of the following data: SV (Super Vision) data indicating the on/off state of the transmission and transformation equipment and TM (Telemeter) indicating active power P, reactive power Q, voltage V, and current I.

The processor 24 reads out the power system operation plan creating program from the memory 25 and executes the power system operation plan creating program. Then, the program calculates and outputs power system operation plans and results of system stability and economy before and after putting the plans into operation. From system configuration schemes thus presented, the system operator is to choose a system configuration and put it in operation, thus enabling it to maintain or improve system stability and economy.

The task of executing the power system operation plan creating program may be shared across multiple processors or computers. Alternatively, the processor 24 may instruct a cloud computer or the like to execute a part or all of the power system operation plan creating program and receive a result of the execution via the communication network.

Besides, while an example in which the power system operation plan creation assistance device 10 retains the database DB1 aggregating power generation plans, total demand prediction/sales plans, renewable energy resources predictions, outage plans, system data, and settings data, the cost database DB2, and the operation plan and evaluation result database DB3 is illustrated with FIG. 1, a cloud server may be used to retain at least any one of these databases.

Figure 2:
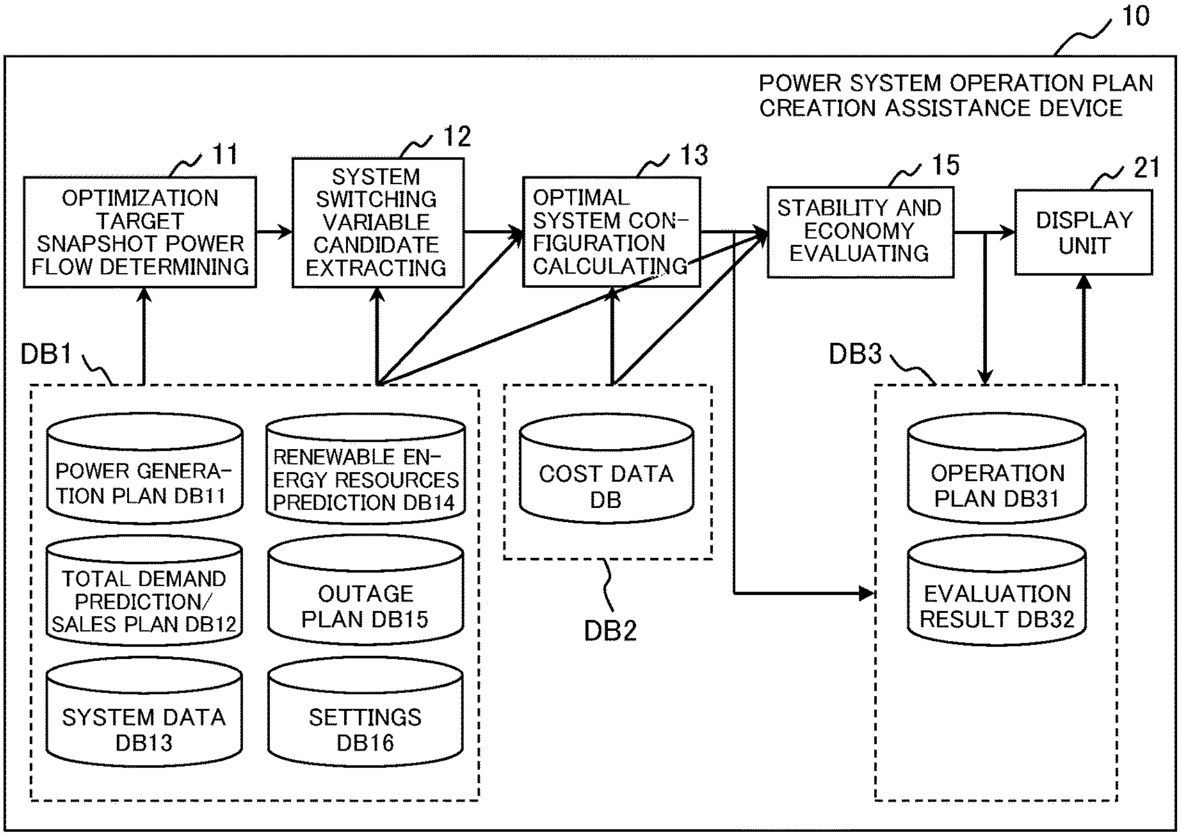
FIG. 2 is a block diagram depicting a functional configuration of the power system operation plan creation assistance device in relevance to embodiment 1 of the present invention.

FIG. 2 is a block diagram depicting a functional configuration of the power system operation plan creation assistance device in relevance to embodiment 1. Note that, in the following description, a wording in which "any given (oo) unit" does an operation as its subject means that the processor 24 reads out the (oo) unit, loads it in a DRAM (Dynamic Random Access Memory), and then implements the function of the (oo) unit.

In FIG. 2, the power system operation plan creation assistance device 10 is equipped with the database DB1 aggregating power generation plans, total demand prediction/sales plans, renewable energy resources predictions, outage plans, system data, and settings data, the cost database DB2, and the operation plan and evaluation result database DB3, an optimization target snapshot power flow determining unit 11, a system switching variable candidate extracting unit 12, an optimal system configuration calculating unit 13, a stability and economy evaluating unit 15, and the display unit 21.

The optimization target snapshot power flow determining unit 11 fetches, as input, one or more data sets archived in the database DB1 aggregating power generation plans, total demand prediction/sales plans, renewable energy resources predictions, outage plans, system data, and settings data, determines snapshot power flows for which to execute optimization (optimization target snapshot power flows), and outputs them to the system switching variable candidate extracting unit 12.

Based on the optimization target snapshot power flows and one or more data sets archived in the database DB1 aggregating power generation plans, total demand prediction/sales plans, renewable energy resources predictions, outage plans, system data, and settings data, the system switching variable candidate extracting unit 12 extracts candidates of system switching variables and outputs them to the optimal system configuration calculating unit 13.

Based on the candidates of system switching variables calculated by the system switching variable candidate extracting unit 12 and one or more data sets of power generation plans, total demand prediction/sales plans, renewable energy resources predictions, outage plans, system data, settings data and cost data archived in the cost database DB2, the optimal system configuration calculating unit 13 can calculate and output optimal system configurations for the snapshot power flows calculated by the optimization target snapshot power flow determining unit 11 using the candidates of switching variables calculated by the system switching variable candidate extracting unit 12. The optimal system configurations are those enabling it to maximize performance of a particular power system for a particular period (including start timing), while minimizing transmission switching times in a system configuration. From system configuration schemes thus presented, the system operator is to choose a system configuration and put it in operation, thus enabling it to maintain or improve system stability and economy.

Based on the optimal system configurations calculated by the optimal system configuration calculating unit 13 and one or more data sets of power generation plans, total demand prediction/sales plans, renewable energy resources predictions, outage plans, system data, settings data, and cost data, the stability and economy evaluating unit 15 calculates results of comparative evaluation of power system stability and economy and stores the results into the evaluation result database DB3.

The display unit 21 displays the results of diverse calculations and the contents of the databases.

Figure 3:
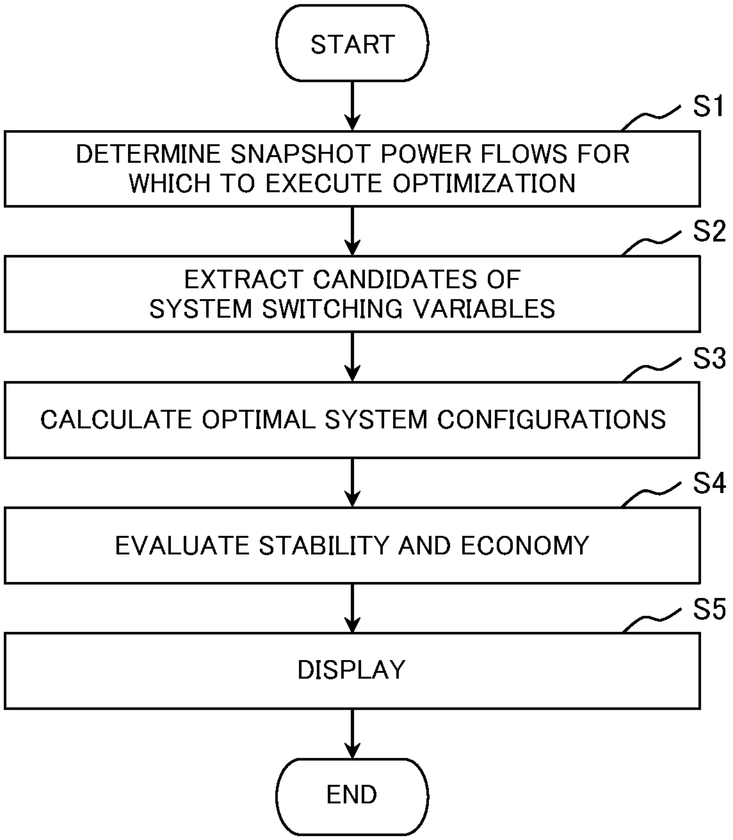
FIG. 3 is a flowchart illustrating a process that is performed by the power system operation plan creation assistance device in FIG. 2.

FIG. 3 is a flowchart illustrating a process that is performed by the power system operation plan creation assistance device in FIG. 2. A first process step S1 in FIG. 3 is a processing function mapped to the optimization target snapshot power flow determining unit 11 in FIG. 2. This step is to fetch, as input, one or more data sets of power generation plans, total demand prediction/sales plans, renewable energy resources predictions, outage plans, system data, and settings data, and determine snapshot power flows for which to execute optimization. The process proceeds to step S2.

Figure 4A:
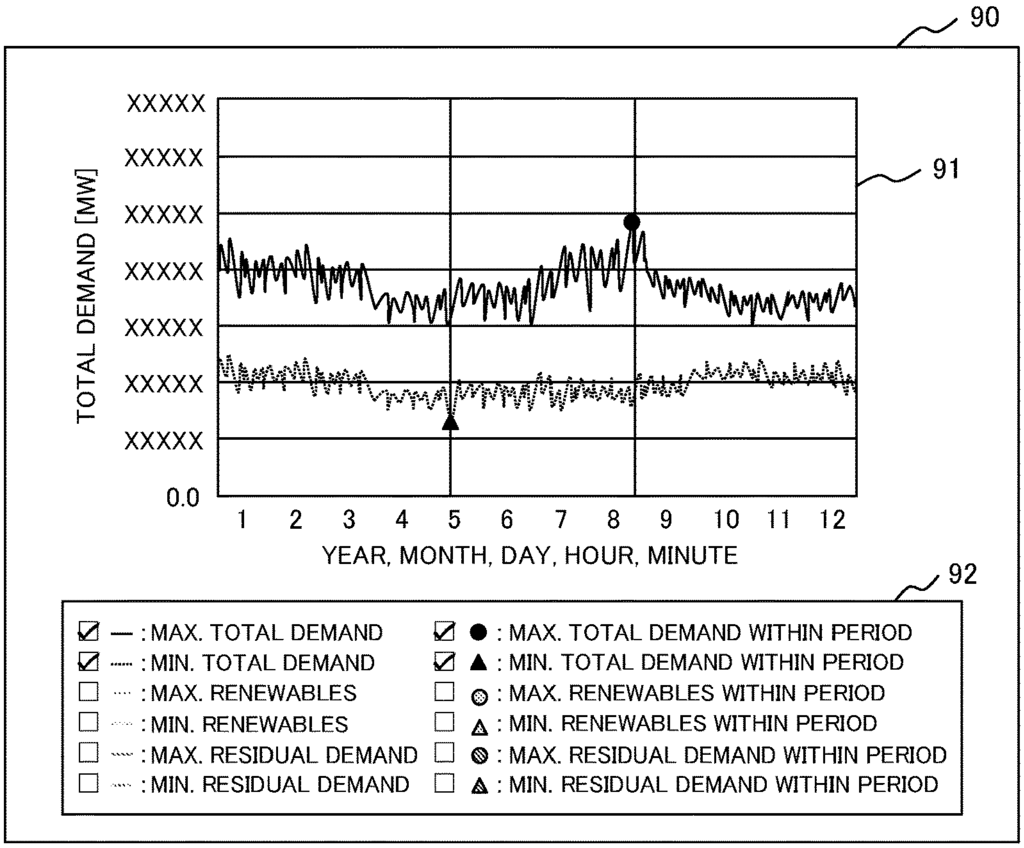
FIG. 4(*a*) is a diagram representing an example of results of calculations by an optimization target snapshot power flow determining unit in FIG. 2.
Figure 4B:
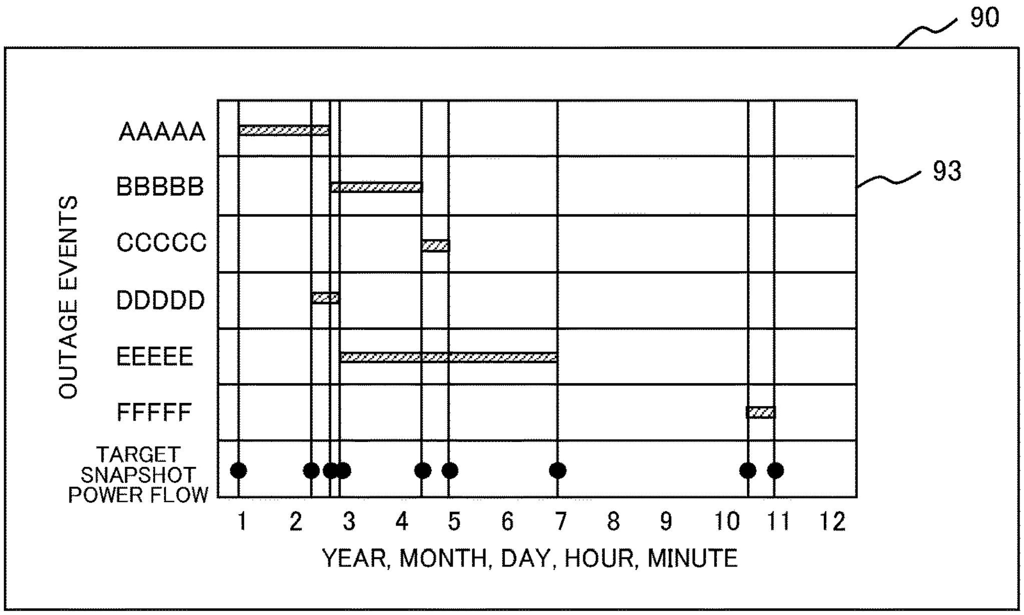

Here, an explanation is provided about a process of determining optimization target snapshot power flows in the process step S1 using FIG. 4(*a*) and FIG. 4(*b*). Note that FIG. 4(*a*) and FIG. 4(*b*) are mentioned as display contents displayed on the screen of the display unit 21.

In a display example of FIG. 4(*a*), as a time chart 91, there is displayed a time domain graph on items chosen from a legend 92 with check boxes presented in a bottom part of the display screen 90 (in this example, maximum and minimum total demands and those within a period are chosen).

In an example of FIG. 4(*a*) which is set forth below to explain a case of determining optimization target snapshot power flows, there is given an example of a process of determining optimization target snapshot power flows based on a total demand prediction, a renewable energy resources prediction, and a residual demand prediction (i.e., total demand prediction from which the renewable energy resources prediction is subtracted) which are predicted in terms of maximum and minimum values in a day-long cycle for a year, for example, calculated by an external system or an internal system; this example is combined with a display example on screen. The period width of data plotted on the abscissa is a period from January to December here; this can be set optionally. For example, a longer period of three years or a shorter period of six months may be set as a target period. Items regarding total demand are only checked in the legend 92 with check boxes in FIG. 4(*a*) and a graph on them is displayed on screen. Thus presenting a graphical display and allowing an operator to choose what is displayed produce an effect in which the operator will easily understand what snapshot power flow has been chosen. If finer time granularity of data is applied, e.g., 8760 hours in units of 30 minutes, data as it is may be used or maximum and minimum values in a day-long cycle may be calculated by pre-processing.

An explanation is provided for an example of determining optimization target snapshot power flows using the total demand prediction data. From the total demand prediction for a set period of one year, the process calculates and displays data for the maximum total demand within the period and the minimum total demand within the period. In this example, the minimum occurs in May, as marked by a black up-pointing triangle, and the maximum occurs in August, as marked by a black circle. By thus extracting timing when the maximum occurs and timing when the minimum occurs within the period, it is enabled to evaluate reliability, stability, and economy of the system for a snapshot power flow where a significant change in the power flow state occurs.

Such a snapshot power flow may be determined from the maximum total demand, but it is not sure whether or not the maximum total demand snapshot power flow has the most potential risk of fault current (short circuit current SCC and ground fault current) through a circuit breaker. Therefore, the process extracts timing when the maximum occurs and timing when the minimum occurs within the period as an indication of the most significant change in the power flow state. For such occasions, any snapshot power flow having a potential risk that has been stored by a planner, an operator, or any other system may be used. Besides, the process may calculate and determine snapshot power flows up to a preset rank. For example, if this setting is up to the second place, data that is extracted is values in the first and second places as the maximum total demand within the period and values in the first and second places as the minimum total demand within the period. The above explanation is also true for a case where a renewable energy resources prediction is used or a case where a residual demand prediction of apparent load is used, which is difference between the total demand prediction and the renewable energy resources predication. Although not depicted, the process may use a prediction based on SNSP (System Non-Synchronous Penetration) that indicates a percentage of non-synchronous generators operating as power supply to demand. Note that, although all the foregoing predictions use values predicted for future snapshot power flows by way of example, data on past snapshot power flows may be used and modified by compensation or the like for future change in the system, thus obtaining predicted values for future snapshot power flows.

Note that subsequent description takes up, by way of example, short circuit current SCC as a fault current through a circuit breaker, but such description can be considered true even for a ground fault current. In a broad concept, countermeasures against a fault current can be taken widely.

Then, by FIG. 4(*b*), the process extracts, as target snapshot power flows, timing to start and timing to terminate each of outage events designated in outage plan data which is set or calculated by an external system or an internal system and displays the outage periods of the events in a screen 93. This is because short circuit current SCC is greatly influenced by a change in the system configuration. Note that it is conceivable that timing to start and timing to terminate an actual outage event may become earlier or later and, therefore, it is expedient to create target snapshot power flows around such timing by preset time width and time units. Besides, in cooperation with an outage plan system, the process may display detailed data selected by options.

Beside, such outage plans are scheduled in time with maintenance of transmission and transformation equipment, protection devices, etc. and enhancement of equipment and devices. Basically, data set or calculated for these plans is considered only internal to a transmission and distribution operator that operates the power system. If the power system also simulates another power system in an external area, short circuit current SCC may flow into the power system from a power supply in another system near to the area of the power system in a range where another power system influences system configurations and power supply configurations in the power system on a simulation level. Hence, the process may display/extract outage events including available data on outage events outside the area of the power system.

Determining optimization target snapshot power flows in a way described above produces an effect in which it is possible to reduce computational complexity and subsequent calculation for critical snapshot power flows can be executed. Also, making a graphical display and displaying display contents in detail produce an effect in which the operator will easily understand what snapshot power flows have been chosen.

At a process step S2, based on optimization target snapshot power flows and one or more data sets of power generation plans, total demand prediction/sales plans, renewable energy resources predictions, outage plans, system data, and settings data, the system switching variable candidate extracting unit 12 in FIG. 2 extracts candidates of system switching variables versus the optimization target snapshot power flows. The process proceeds to step S3.

Figure 5:
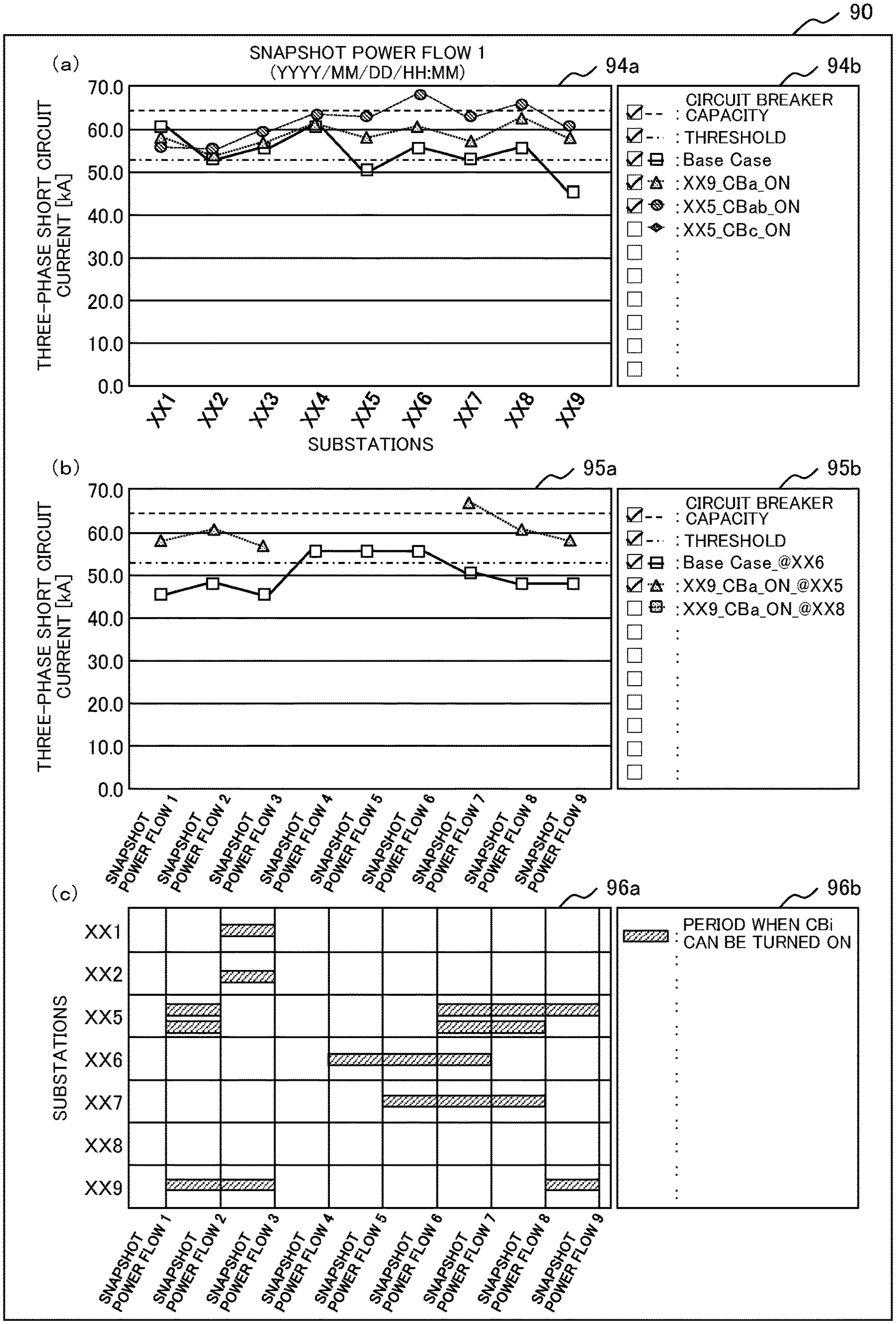
FIG. 5 is a diagram representing an example of results of calculations by a system switching variable candidate extracting unit in FIG. 2.

Here, an explanation is provided about a process of extracting system switching variable candidates in the process step S2, using FIG. 5. In examples here, display contents 94*a*, 95*a*, 96*a* displayed on the screen 90 of the display unit 21 are graphs with their legends 94*b*, 95*b*, 96*b*.

As the display contents 94*a* in a top row of FIG. 5, the process step S2 displays a graph of three-phase short circuit current [kA] plotted on the ordinate at respective substations (on the abscissa) with regard to snapshot power flow 1 among snapshot power flows (from snapshot power flow 1 to snapshot power flow 9) determined as optimization-target cross sections. Note that three-phase short circuit current is an example and an object of calculation may be single-phase short circuit current or ground fault current. Also, the respective substations may be respective nodes or locations where a fault is anticipated in the transmission and transformation equipment.

Snapshot power flow 1 is designated as a Base Case in a legend 94*b* on the right side of the graph. By executing calculation of short circuit current based on one or more data sets of power generation plans, total demand prediction/sales plans, renewable energy resources predictions, outage plans, system data, and settings data for the snapshot power flow, a plotted line of three-phase short circuit current [kA] at the substations can be displayed in the graph of the display contents 94*a*. Note that, as a method of calculating short circuit current and short circuit capacity among others, a method described in "Aratame Kozo: Application of Power System Technical Calculation, Denki Shoin, p. 121-194" and "Tamura Yasuo: Power System Planning and Operation, Ohmsha, p. 195-199" may be used. For example, short circuit current and short circuit capacity of each bus can be calculated by creating an impedance matrix using system data on transmission lines, transformers, generators, etc. that constitute the system.

Circuit breaker capacity is chosen in the legend 94*b* and displayed as a dotted line in the display contents 94*a* (65 kA in the graph example). In a phase of equipment planning to seek how much the circuit breaker capacity should be, calculation is executed under system conditions in which all generators are put in operation and both the first and second buses of the substations are used for the purpose of finding the maximum short circuit current. However, this process step is intended to find short circuit current for future snapshot power flows, i.e., optimization target snapshot power flows. Therefore, when creating an impedance matrix, calculation is executed reflecting outage plans and bus connection rules (inter alia, conditions by which a generator is always disconnected from a bus, which are set by planner or operator) for current snapshot power flows. Thereby, it is possible to execute snapshot power flow and short circuit current calculations with high accuracy to obtain future snapshot power flows that are created in the planning phase. Of course, an admittance matrix that is created by a power flow calculation program may be used. This enables it to reduce computational complexity of recalculations to be executed.

Here, in order to extract system switching variable candidates, the process first looks for a substation node where short circuit current is less than a preset threshold being stored in the settings data. The threshold may be set with respect to the capacity of each of the circuit breakers installed in the substations or set as a ratio to circuit breaker capacity, such as a value of the capacity decreased by some percent. Note that threshold is chosen in the legend 94*b* and displayed as a long dashed dotted line (53 kA in the graph example) in the display contents 94*a*.

In the case of the display contents 94*a* displaying short circuit current at the substations for snapshot power flow 1, three-phase short circuit current for Base Case is plotted by square points in addition to the circuit breaker capacity (65 kA in the graph example) displayed as the dotted line and the threshold (53 kA in the graph example) displayed as the long dashed dotted line. In the graph example, it is seen that three-phase short circuit current at substations XX5 and XX9 is less than the threshold (53 kA in the graph example) displayed as the long dashed dotted line.

Then, the process creates patterns in which a switch detached for system configuration alteration, such as a switch detached for, inter alia, bus splitting (bus separation), divisional operation of transformers, or transmission line loop opening, is linked in (turned ON) in the nodes (substations XX5 and XX9). Such patterns may be created assuming that each switch is operated singly or assuming combined operation of switches. Besides, patterns created and set optionally by a planner or operator or automatically calculated patterns may be modified. In this way, circuit breaker linked-in conditions can be created flexibly. However, because combinations of patterns are considered to increase computational complexity so much, the calculation burden should be restricted to the preset number of pattern combinations, e.g., two combinations. This enables it to reduce computational complexity and exclude switching that is performed infrequently, such as multi-concurrent switching. Subsequent explanation assumes conditions in which pattern combinations are excluded from consideration.

Furthermore, the process executes short circuit current SCC calculations under the execution of each of the switch linked-in patterns at the nodes (substations XX5 and XX9) where SCC is less than the threshold. Because three-phase short circuit current of BaseCase is less than the threshold at the substation XX9, for example, a result of three-phase short circuit current calculation under execution of "XX9_CBa_ON" as one of the patterns which means that CBa (Circuit Breaker a) in the substation XX9 is turned ON (linked in) is plotted for each substation in the display contents 94*a* in the top row of FIG. 5. Therefore, such pattern becomes a system switching variable candidate for this snapshot power flow. The system switching variable candidate is displayed as "XX9_CBa_ON" in the legend 94*b*.

At the same time, for the substation node XX5 in which three-phase short circuit current of BaseCase is also less than the threshold, this substation has two circuit breakers CBs and, therefore, a pattern in which CBab is set ON and a pattern in which CBc is turned ON are created. These patterns are displayed as "XX5_CBab_ON" and "XX5_CBc_ON" in the legend 94*b*.

Here, in regard to the patterns in the legend 94*b*, a plotted line of three-phase short circuit current under Base Case is displayed by square points, a plotted line of three-phase short circuit current under execution of "XX9_CBa_ON" is displayed by black up-pointing triangle points, and a plotted line of three-phase short circuit current under execution of "XX5_CBab_ON" is displayed by black circle points. The checkboxes of these patterns are checked. Thereby, under execution of the checked patterns marked by square, black up-pointing triangle, and black circle, magnitude of three-phase short circuit current is plotted for each node in the display contents 94*a*. In other words, while the graph basically displays a distribution of three-phase short circuit current under Base Case, as marked by square points, it also displays new distributions of three-phase short circuit current, as marked by black up-pointing triangle points and black circle points for cases where each circuit breaker is turned, when the cases are specified and checked.

By this graph, when looking at the "XX5_CBab_ON" pattern whose check box is checked in the legend 94*b*, a plotted line with black circle points in the graphic display indicates that the turn ON of this circuit breaker is the pattern that causes SCC to exceed the circuit breaker capacity 65 kA at substation nodes XX6 and XX8 for this snapshot power flow. As a result, it can be noticed that this circuit breaker cannot be switched ON and has to be set OFF. In contrast, for the "XX9_CBa_ON" pattern marked by a black up-pointing triangle, the turn ON of this circuit breaker does not cause SCC to exceed the circuit breaker capacity 65 kA and this means that switching is possible.

Therefore, for this snapshot power flow, "XX5 CBab_ON" is excluded from system switching variable candidates. Note that, although these SCC graphs are displayed for a particular snapshot power flow; a histogram display of SCC for each node may be applied for 8760-hour analysis and a decision as to whether to include or exclude a pattern in/from system switching variable candidates may be, for example, made depending on whether or not a maximum value is less than a threshold. This allows a planner or operator to visually understand, inter alia, a node that constantly has a potential risk of short circuit current SCC and can be helpful for future equipment planning, operation planning, and outage planning.

Then, in the display contents in a middle row of FIG. 5, the abscissa is a series of optimization target snapshot power flows (snapshot power flows 1 to 9 here) and three-phase short circuit current plotted on the ordinate is graphed in the same way as in the top row. In this display, the time domain sequence of the snapshot power flows enables it to extract switching variables with continuity.

First, a waveform of SCC change at the XX6 node specified as BaseCase versus the snapshot power flows is displayed, plotted by square points. From this graph, it is seen that snapshot power flows at which SCC is less than or equal to the threshold are snapshot power flows 1, 2, 3, 7, 8, and 9. With respect to the snapshot power flows determined to have a margin, as SCC is less than or equal to the threshold, three-phase short circuit current under execution of "XX9_CBa_ON" switching at a node is further plotted by black up-pointing triangle points.

By turning CBa_ON, SCC may exceed the circuit breaker capacity at a snapshot power flow like snapshot power flow 7. Switching at such a snapshot power flow is excluded from calculation to derive a "period when CBi can be turned ON" which is illustrated in a bottom row of FIG. 5. For the graph in the middle row, when a pattern of turning a circuit breaker CB ON at a particular node is executed, what node for which short circuit current SCC will be plotted can be chosen and displayed, such as "XX9_CBa_ON_@XX5". However, when "XX9_CBa_ON" switching is executed, a graph of SCC may be displayed for a node where SCC flowing through a circuit breaker CB becomes maximum among all nodes. This enables it to reduce effort of checking short circuit current SCC on a per-node basis.

Then, in the bottom row of FIG. 5, the abscissa is a series of the optimization target snapshot power flows, as in the middle row of FIG. 5, and the ordinate is a series of substations. As a result of extracting system switching variable candidates, time bands are graphed to clearly display that CBi can be turned ON for what period across snapshot power flows.

Here, the reason why it is unnecessary to display Substations XX3 and XX4 on the ordinate is that they are nodes for which a period when switching is possible does not exist across all snapshot power flows. Besides, a substation like XX8 is provided with a pattern in which switching is possible, but execution of the switching causes SCC to exceed the circuit breaker capacity for all snapshot power flows. The graph may be designed to display no time bands for such substation. An effect thereof is that check can be made focusing on only patterns in which switching is possible.

Note that multiple bands can be displayed in the row for a substation like XX5 that is provided with multiple switching patterns. Although not presented in the graph in the bottom row, labeling and displaying patterns so that what pattern can be identified produces an effect in which patterns are easily distinguishable. Collectively displaying time ranges in which switching is possible for each node, as in the bottom row of FIG. 5, produces an effect of allowing a planner or operator to clearly understand what switching is possible at what timing as a candidate.

Note that when synchronous generators lessen with an increase in renewable energy resources, a short circuit ratio (SCR) decreases with a decrease in short circuit current SCC and low frequency vibration is liable to be generated. In this case, the short circuit ratio (SCR) decreases with a decrease in short circuit current SCC and, consequently, system switching may become impossible in such a case. Therefore, switching variables to enable system switching even with a decrease in short circuit current SCC should be selected to the extent possible based on calculations of constraints of, inter alia, the short circuit ratio SCR that is a trade-off factor. An effect thereof is that it is possible to extract switching variables that make switching possible more realistically.

At a process step S3, based on the candidates of system switching variables calculated by the system switching variable candidate extracting unit 12 and one or more data sets of power generation plans, total demand prediction/sales plans, renewable energy resources predictions, outage plans, system data, settings data, and cost data, the optimal system configuration calculating unit 13 calculates optimal system configurations for the snapshot power flows calculated by the optimization target snapshot power flow determining unit 11, using the switching variable candidates calculated by the system switching variable candidate extracting unit 12. The process proceeds to step S4. The optimal system configurations are those enabling it to maximize performance of a particular power system for a particular period (including start timing), while minimizing transmission switching times in a system configuration.

Figure 6:
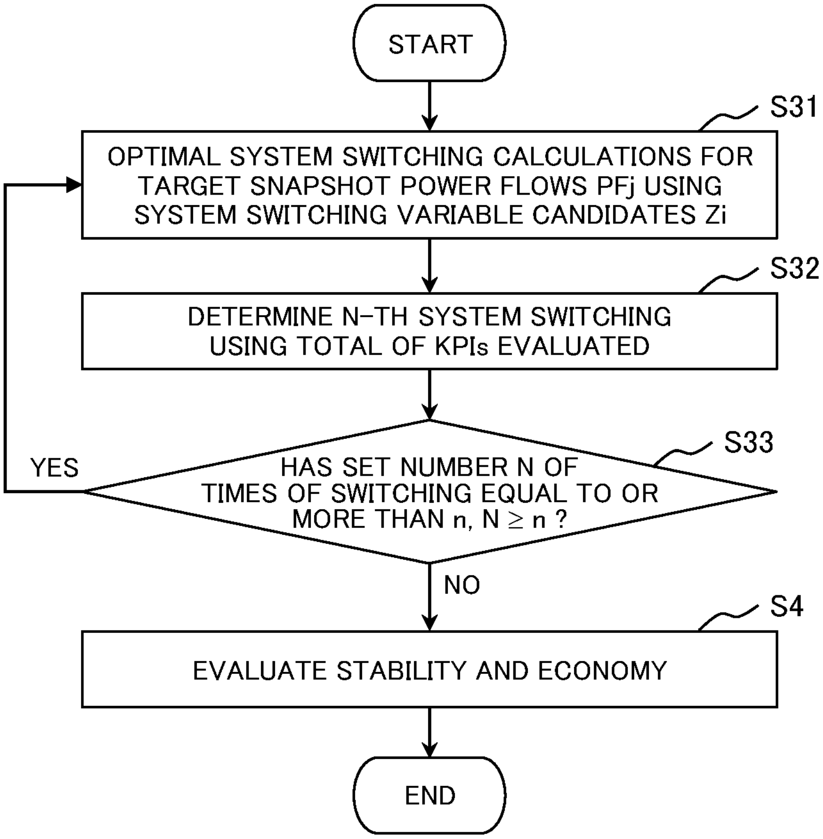
FIG. 6 is a flowchart illustrating a process that is performed by an optimal system configuration calculating unit and a stability and economy evaluating unit in FIG. 2.

Here, an explanation is provided about a process of calculating optimal system configurations in the process step S3 using FIG. 6. First, at a process step S31, the process iteratively executes optimal system switching calculations for all the target snapshot power flows PFj (Power Flow Condition j), determined in the process step S1, using each of the system switching variable candidates Zi extracted in the process step S2. The calculations include evaluating whether or not constraints on stability in diverse aspects (thermal capacity, stability of synchronization, voltage stability, frequency stability, and short circuit capacity (short circuit current)) are fulfilled and evaluating how much a margin is. The calculations also include evaluating the values of Key Performance Indicators (KPIs) (including, inter alia, cost required to maintain or improve system stability and cost required to improve economy; in particular, balancing power cost; transmission loss cost; cost pertaining to maintenance required of transformer tapping; cost pertaining to circuit breakers for turning on/off of phase modifying equipment; and cost pertaining to maintenance of circuit breakers and operator operation for transmission switching and evaluating how much the sum total or the like is. Note that Key Performance Indicators are abbreviated to KPIs in the following description.

Here, for the optimal system switching calculations, the following may be used: inter alia, OTS (Optimal Transmission Switching) calculation, OTS calculation with SCC constraints, OPF (Optional Power Flow) calculation, and OPF with various constraints, which are referred to in Non-patent Literatures 2 and 3; OPF for multiple snapshot power flows, power flow calculation, and power flow calculation with constraints, which are referred to in Non-patent Literature 1; and a combination of those mentioned above. As results of diverse calculations, if diverse constraints cannot be fulfilled, if an event of non-convergence occurs, or if the number of convergence calculations has exceeded a predetermined number of times, the process discards a resultant solution and continues iterative calculations. An effect thereof is that it is possible to derive a solution, while preventing the creation of future snapshot power flows by executing an unrealistic switching.

At a process step S32, using, inter alia, a total value and an average value of the KPIs mentioned above for all the snapshot power flows, the process determines a pattern of n-th system switching carried out that leads to, e.g., the highest total of KPIs.

At a process step S33, if n is less than the preset number N of times of switching, the process fixates the switching determined at the process step S32, returns to the process step S31, and continues calculations from the process step S31 with the exception (fixation) of that switching. The process terminates the calculations at a time when the set number N of times of switching has become equal to or more than n, $N \geq n$ and moves to a process step S4. In this way, it is possible to provide an optimal solution, while preventing combinations of switching patterns from becoming so much and. n is an integer beginning from zero and $n=0$ indicates a Base Case and no switching.

Besides, a progress bar displaying time to terminate calculations during execution of the calculations is displayed to allow an operator to stop the calculations in the middle or break the calculations. If the operator has stopped the calculations in the middle, the process displays results of the calculations executed for the period before the stop. Thereby, the operator is allowed to make planning and operation without feeling stress.

Besides, when an switching pattern as a result obtained by the foregoing optimal system configurations calculated using the foregoing system switching variables is actually executed, the process also calculates and displays information (such as unlock) to be set for existing protection devices (such as a bus tie protection relay) at the same time. An effect thereof is that a planner or operator can manage protection of the system as well appropriately.

If, after a system switching is executed, the system should return to a state when it was, the process displays that a switching for return may be required for, e.g., a switching that influences snapshot power flows in a next year to alert an operator not to forget such switching; alternatively, the process executes calculations including snapshot power flow data in the next year to allow an operator to understand timing to start and terminate an optimal system switching. An effect thereof is making it possible for a system planner or operator to execute a switching at required timing certainly.

If switching on/off occurs consecutively at short interval timings of switching, like hunting, for instance, if, even though a solution is sought with a setting of $N=2$ only for a year, a result of calculation is that switching on/off in February and switching on/off in April are optimal, the process is to condense the switching schedule, e.g., after switching on in February, switching off in April, to make switching times as small as possible and also calculates and displays a solution with reduced cost for switching as a total of KPIs. An effect thereof is reducing system switching cost and making it easy to understand for the system planner or operator as in conventional system switching.

At a process step S4, based on the optimal system configurations calculated by the optimal system configuration calculating unit 13 and one or more data sets of power generation plans, total demand prediction/sales plans, renewable energy resources predictions, outage plans, system data, settings data, and cost data, the stability and economy evaluating unit 15 calculates results of comparative evaluation of power system stability and economy and stores the results into the evaluation result database DB3.

Here, an explanation is provided about results of evaluation of stability and economy in the process step S4 using FIG. 6. At the process step S4, using margin values from stability constraints, the evaluated values of respective KPIs, and the evaluated value of the total of KPIs resulting from the optimal calculations with respective switching patterns and a combination thereof for all the snapshot power flows, calculated through the process steps S31 to S33, the process evaluates whether or not these values are more than preset values for evaluation display and filters out data to be displayed in a KPI evaluation diagram with each KPI being plotted on the axes, which is displayed at a process step S5. In this way, the process only displays solutions at higher ranks to some extent without presenting all evaluation results. An effect thereof is allowing a planner or operator to easily choose a switching subsequently.

At the process step S4, the process also indicates what difference occurs in the total of KPIs for all the cross sections by switching executed, e.g., n times, and executed, e.g., once and twice. An effect thereof is allowing a planner or operator to make a decision easily.

Furthermore, the process enables it to display how stability in other aspects changes before and after the execution of a switching, as is the case for the results of evaluation of SCC under execution of different switchings, as illustrated in FIG. 5. Thereby, e.g., as for voltage stability, the process calculates data required for display in a diagram like FIG. 5(*a*) and FIG. 5(*b*) with voltage or voltage margin being plotted on the ordinate. Also, the process may execute and display supply reliability calculations as in Non-Patent Literature 1.

Next, at a process step S5, the display unit 21 displays the results of diverse calculations and the contents of the databases. An operator will check operation plans as system configuration schemes and results of evaluation of stability and economy thereof, thus presented, and a system operator is to choose a system configuration and put it in operation, thus enabling it to maintain or improve system stability and economy.

Figure 7:
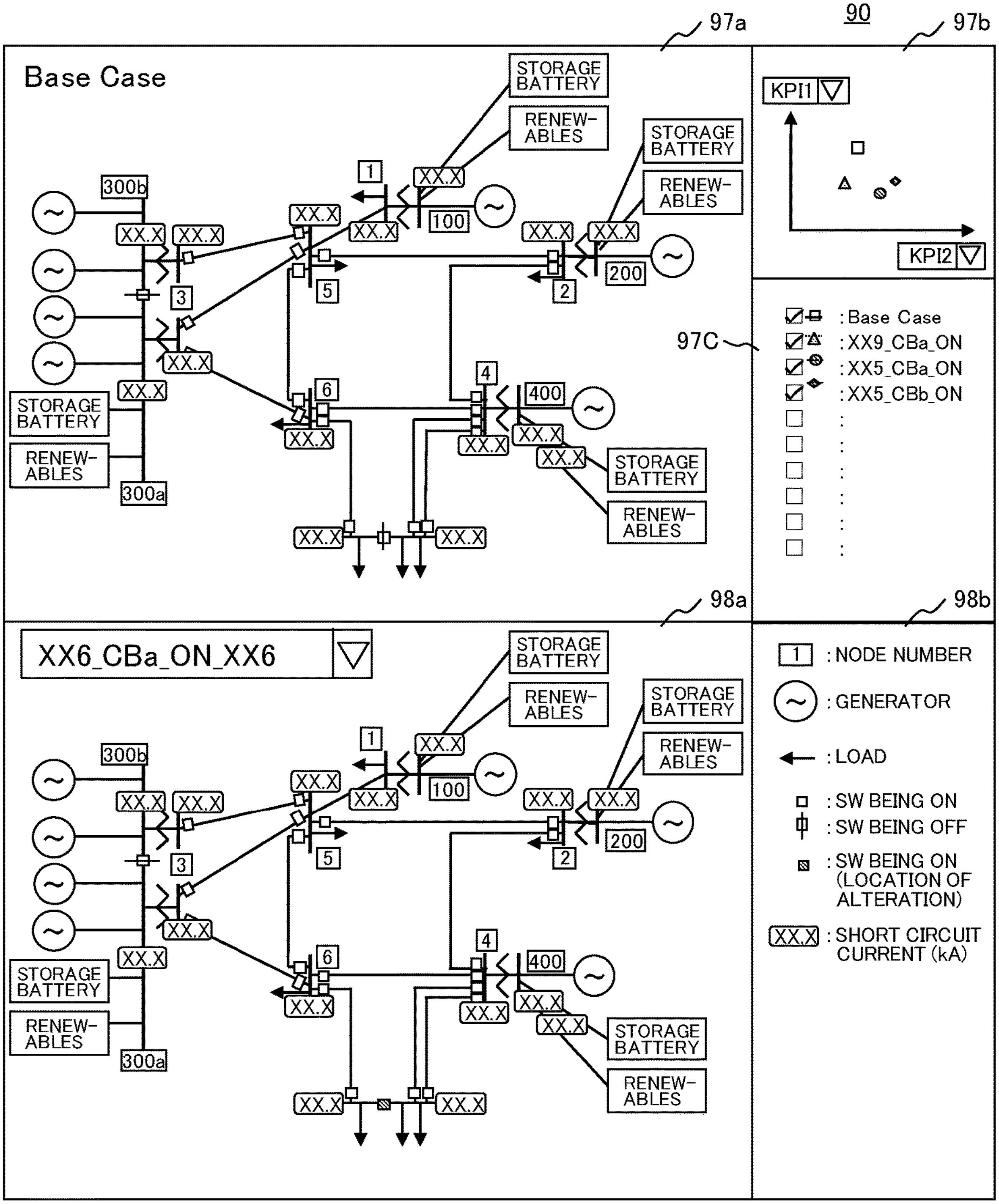
FIG. 7 is a diagram representing an example of results of calculations by the optimal system configuration calculating unit and the stability and economy evaluating unit in FIG. 2.

Here, an explanation is provided about the process step S5 using FIG. 7. By a system diagram in this figure, according to switching patterns in a system configuration, as an operation plan, the display unit displays where switching occurred in the system configuration in an easy-to-understand manner and allows an operator to choose what KPIs are plotted in a graph and presence or absence of them. An effect thereof is making a planner or operator easily understand switching details.

Note that a display screen 90 of FIG. 7 juxtaposes a display 97*a* of a system configuration for Base Case and a display 98*a* of a system configuration when a chosen circuit breaker is turned on. Furthermore, a KPI comparison screen 97*b* and a legend 97*c* are displayed together with the system configuration display 97*a* and a legend 98*b* is displayed together with the system configuration display 98*a*.

As in the bottom row of FIG. 5, making a graphical display of switching timings as well produces an effect of making a planner or operator easily understand switching details. Here, making a display in conjunction with an outage plan and timings of connection/disconnection of generators produces an effect in which an operator will easily understand balance with another task (system operation plan).

Note that the process steps S1 to S5 also have a function of making recalculations, if input data includes a great alteration in the system. A planner or operator may execute recalculations optionally. When doing so, displaying differences found by rolling of results produces an effect of making it easy for a planner or operator to grasp influences.

As described hereinbefore, according to embodiment 1, it is possible to provide system configurations enabling it to maximize performance of a particular power system for a particular period (including start timing), while minimizing transmission switching times in a system configuration. From system configuration schemes thus presented, the system operator is to choose a system configuration and put it in operation, thus enabling it to maintain or improve system stability and economy.

Embodiment 2

Here, an explanation is provided about embodiment 2 that assists equipment plans with information resulting from the calculations as performed in embodiment 1 and information obtained by additional calculations.

Short circuit current SCC calculations in embodiment 1 include calculating a probability in which short circuit current SCC declines and a ratio thereof and the resulting information is displayed. An effect thereof is allowing an operator to consider whether it is possible to change the capacity of a circuit breaker to a lower capacity (downgrade it).

Note that the present invention is not limited to the embodiments described hereinbefore and various modifications are included therein. By way of example, the foregoing embodiments are those described in detail to explain the present invention to make it easy to understand (clearly) and the invention is not necessarily limited to those including all components described. Besides, a subset of the components of an embodiment may be replaced by components of another embodiment and components of another embodiment may be added to the components of an embodiment. Besides, for a subset of the components of each embodiment, other components may be added to the subset or the subset may be removed or replaced by other components. Besides, a subset or all of the aforementioned respective components, functions and processing units or the like may be implemented by hardware; for example, inter alia, by designing an integrated circuit to implement them.

REFERENCE SIGNS LIST

DB1: database aggregating power generation plans, total demand prediction/sales plans, renewable energy resources predictions, outage plans, system data, and settings data, DB2: cost database, DB3: operation plan and evaluation result database,

20: power system,

10: power system operation plan creation assistance device,

11: optimization target snapshot power flow determining unit,

12: system switching variable candidate extracting unit,

13: optimal system configuration calculating unit,

15: stability and economy evaluating unit,

21: display unit,

22: input unit,

23: communication unit,

24; processor,

25: memory,

26: storage device,

27: bus,

300: communication network

The invention claimed is:

1. A power system operation plan creation assistance device characterized by comprising:

an optimization target snapshot power flow determining unit which determines snapshot power flows for which to execute optimization using one or more data sets of basic information comprising power generation plans, total demand predictions, sales plans, renewable energy resources predictions, outage plans, system data, and settings;

a system switching variable candidate extracting unit which extracts candidates of system switching variables using snapshot power flows for which to execute optimization determined by the optimization target snapshot power flow determining unit and one or more data sets of the basic information;

an optimal system configuration calculating unit which calculates optimal system configurations using system switching variable candidates extracted by the system switching variable candidate extracting unit and one or more data sets of the basic information;

a stability and economy evaluating unit which evaluates stability and economy using operation plans as optimal system configurations calculated by the optimal system configuration calculating unit and one or more data sets of the basic information; and a display unit which displays on screen, evaluation results obtained by the stability and economy evaluating unit and the operation plans.

2. The power system operation plan creation assistance device according to claim 1, characterized in that the optimization target snapshot power flow determining unit obtains maximum and minimum values, up to a set rank, among results of a total demand prediction, a renewable energy resources prediction, a residual demand prediction, and a prediction by a percentage of non-synchronous generators and time points before and after start of each of planned outage events and narrows down targets for which to execute calculations to snapshot power flows corresponding to what points of time for a particular period.

3. The power system operation plan creation assistance device according to claim 1, characterized in that the system switching variable candidate extracting unit extracts system switching variable candidates by creating switching patterns and executing fault current calculations under a base case and under execution of an switching pattern.

4. The power system operation plan creation assistance device according to claim 1, characterized in the optimal system configuration calculating unit obtains optimal system configurations using one or more of optimal power flow calculation, optimal power flow calculation with constraints, system switching optimization calculation, system switching optimization calculation with constraints, power flow calculation, and power flow calculation with constraints.

5. The power system operation plan creation assistance device according to claim 1, characterized by calculating and displaying information to be set for existing protection devices at the same time in conjunction with one of the optimal system configurations calculated using the system switching variable candidates.

6. The power system operation plan creation assistance device according to claim 1, characterized in that the display unit displays on screen, switching patterns and their related system's Key Performance Indicators and stability margins, an outage plan, and a parallel power supply connection plan among others.

7. The power system operation plan creation assistance device according to claim 1, characterized in that the display unit displays a graph in which a plotted line of a fault current through a circuit breaker observed at multiple locations under a basic configuration of a power system is displayed along with a circuit breaker capacity and a plotted line of the fault current through a circuit breaker observed at the multiple locations upon an alteration to the power system configuration by switching of a circuit breaker is also displayed in the graph.

8. A power system operation plan creation assistance method that is implemented with a computer, characterized by comprising:

an optimization target snapshot power flow determining step which determines snapshot power flows for which to execute optimization using one or more data sets of basic information comprising power generation plans, total demand predictions, sales plans, renewable energy resources predictions, outage plans, system data, and settings;

a system switching variable candidate extracting step which extracts candidates of system switching variables using snapshot power flows for which to execute optimization determined by the optimization target snapshot power flow determining step and one or more data sets of the basic information;

an optimal system configuration calculating step which calculates optimal system configurations using system switching variable candidates extracted by the system switching variable candidate extracting step and one or more data sets of the basic information;

a stability and economy evaluating step which evaluates stability and economy using operation plans as optimal system configurations calculated by the optimal system configuration calculating unit and one or more data sets of the basic information; and a displaying step which displays on screen, evaluation results obtained by the stability and economy evaluating step and the operation plans.

9. A power system operation plan creation assistance method according to claim 8 that is implemented with a computer, characterized by:

extracting candidates of system switching variables and snapshot power flows at which to observe changes in a fault current using demand predictions, renewable energy resources predictions, power generation predictions, outage plans, and system data; seeking a solution by optimal power flow calculation or system switching optimization calculation using the system switching variables and generator output variables at all alternations made by each of the system switching variables; and displaying a degree of reliability, system's Key Performance Indicators, and operation plans.

* * * * *